United States Patent
Lidström et al.

(10) Patent No.: US 8,345,843 B2
(45) Date of Patent: Jan. 1, 2013

(54) METHOD AND ARRANGEMENT FOR HANDLING COMMUNICATION REQUESTS FROM UNKNOWN PARTIES

(75) Inventors: Mattias Lidström, Stockholm (SE); Johan Hjelm, Tokyo (JP); Theo Kanter, Rönninge (SE); Asparuh Rashid, Nynäshamn (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 824 days.

(21) Appl. No.: 12/301,583

(22) PCT Filed: May 7, 2007

(86) PCT No.: PCT/SE2007/000443
§ 371 (c)(1),
(2), (4) Date: Jul. 30, 2009

(87) PCT Pub. No.: WO2007/136314
PCT Pub. Date: Nov. 29, 2007

(65) Prior Publication Data
US 2010/0020953 A1    Jan. 28, 2010

(30) Foreign Application Priority Data
May 19, 2006    (SE) ........................ 0601124

(51) Int. Cl.
*H04M 1/56* (2006.01)

(52) U.S. Cl. ............... 379/142.06; 379/207.15; 455/415

(58) Field of Classification Search ............ 379/142.06, 379/207.15
See application file for complete search history.

(56) References Cited

U.S. PATENT DOCUMENTS

| | | | |
|---|---|---|---|
| 7,536,710 B2 * | 5/2009 | Dunn | 726/2 |
| 7,711,390 B2 * | 5/2010 | Jung | 455/412.1 |
| 7,797,293 B2 * | 9/2010 | Pabla et al. | 707/705 |
| 8,009,812 B2 * | 8/2011 | Bruce et al. | 379/88.13 |
| 2001/0025349 A1 * | 9/2001 | Sharood et al. | 713/340 |
| 2003/0130893 A1 * | 7/2003 | Farmer | 705/14 |
| 2005/0141462 A1 * | 6/2005 | Aerrabotu et al. | 370/335 |
| 2006/0046720 A1 | 3/2006 | Toropainen | |
| 2008/0125148 A1 * | 5/2008 | Zhao et al. | 455/466 |

FOREIGN PATENT DOCUMENTS

| | | |
|---|---|---|
| EP | 1143667 A2 | 10/2001 |
| EP | 1396989 A2 | 3/2004 |
| WO | WO 9957916 A1 | 11/1999 |

* cited by examiner

*Primary Examiner* — Simon Sing (57) ABSTRACT

A method and apparatus for performing a caller investigation in order to provide relation information to a called party (200) regarding an unknown calling party (202), when implemented in a service entity (204) serving said called party. A relation query for the calling party is received from the called party, and it is then determined whether the calling party is known and related to any third party directly or indirectly known to the called party by checking a contact list (210-214) defined for said third party. The reliability of the calling party can then be better assessed based on how the calling party is related to the called party, if related at all. The called party may use this information for deciding how to respond to a communication request from said calling party.

25 Claims, 3 Drawing Sheets

METHOD AND ARRANGEMENT FOR HANDLING COMMUNICATION REQUESTS FROM UNKNOWN PARTIES

TECHNICAL FIELD

The present invention relates generally to a method and arrangement for handling an incoming call or other communication request from an unknown party. In particular, the invention can be used for determining how to respond to the incoming call or request.

BACKGROUND OF THE INVENTION AND PRIOR ART

With the advent of 3G mobile telephony, new packet-based communication technologies have been developed for communicating multimedia content. For example, GPRS (General Packet Radio Service) and WCDMA (Wideband Code Division Multiple Access) technologies support wireless multimedia telephony services involving packet-switched communication of data representing images, text, documents, animations, audio files, video clips, etc., in addition to traditional circuit-switched voice calls. Further, new sophisticated mobile terminals are also emerging on the market, equipped with functions and features to handle the new services, including high resolution colour displays and multiple codecs (coders/decoders) for different multimedia formats.

Recently, a service network architecture called "IP Multimedia Subsystem" (IMS) has been developed by the $3^{rd}$ Generation Partnership Project (3GPP) as an open standard, to provide multimedia services in the packet domain for primarily mobile clients. Generally, IMS is a platform for enabling services based on IP transport, more or less independent of the access technology used and basically not restricted to any limited set of specific services.

Briefly described, an IMS network can be connected to different access networks, such as mobile (or cellular) networks or broadband access networks, to enable multimedia sessions for terminals in communication with those access networks. Among other things, an IMS network contains session managing nodes, subscriber databases and various application servers. The session managing nodes are used for controlling multimedia sessions, including the nodes S-CSCF (Serving Call Session Control Function), I-CSCF (Interrogating Call Session Control Function) and P-CSCF (Proxy Call Session Control Function). Invoked multimedia services are enabled and executed by the application servers. Further, a main database element HSS (Home Subscriber Server) stores subscriber and authentication data as well as service information, among other things, available to the application servers and session managing nodes.

A specification for session set-up has been defined called "SIP" (Session Initiation Protocol, according to the standard IETF RFC 3261 et al), which is an application-layer signalling protocol for controlling sessions over a packet-switched logic. SIP is generally used by session managing nodes in IMS networks in support of multimedia services. The concept of IMS service networks is well-known in the field of telecommunication, and the various functions of the IMS network elements are not necessary to describe here further to understand the present invention.

One example of services that can be employed by means of an IMS network is the so-called "Presence" services. Presence services basically involve the publishing of "presence data" of a user to make it available for other users and applications, which further can be used to control other services in turn. Presence data basically defines the state or situation of a user and his/her equipment in some predefined respect. Thus, the term "presence" is here given a very broad meaning, and the presence data may include, by way of example, the following:

A user identity chosen by the user for presence communication by which he/she is known to other users, e.g. as an alias.

A user status, e.g. available, busy, in a meeting, on holiday, etc.

A terminal status, e.g. switched on/off, engaged, out of coverage, etc.

The geographic location of the user/terminal, as well as other aspects on the physical condition of the user/terminal. In future extensions of the support, this may include: acceleration, orientation, light condition, temperature, etc.

Terminal capabilities and selections, including functions for SMS, MMS, chatting, games, video, etc.

Other personal user information, e.g. interests, occupations, personal characteristics, moods, etc.

This information, or any selected parts thereof, is stored in an application server in the IMS network, based on so-called "publications of events" received from the network or a user, whenever the user changes any of his/her presence data. A user may also subscribe for selected presence data of one or more other users, e.g. according to a list of users. Such presence subscriptions are typically also handled by an application server in the IMS network. The subscribing user can then receive notifications regarding current presence data, either automatically or upon request. In SIP, a message called "SIP PUBLISH" can be used to provide dynamic data to an application server in the IMS network. Further, another SIP message called "SIP SUBSCRIBE" can be used by users to subscribe for dynamic data of other users, as handled by the application server.

The presence services are thus typically based on different communication groups of users that can be established around various subjects, such as a football team, a chat group, a working project, etc, and contact lists are maintained for such groups. When belonging to such a communication group, the members are naturally willing to communicate with other group members using certain specified functions and types of media. Thus, the set of available functions of a particular user are "exposed" to the group by means of the presence data and the above-mentioned publish/subscribe mechanisms.

However, the mere fact that available functions and media types are exposed in this way for different users makes the users susceptible to illicit attacks or "spamming" over those functions and media types, e.g. after interception of messages communicated for the presence services. Further, users may have good reason to be cautious when being contacted by unknown parties since replying to a communication request or invitation will typically expose and even validate the current address of the called user to a potentially malicious caller. Depending on the addressing standard used, the exposed address may include an IP address, an e-mail address such as SIP-URI, an alias associated with an SIP-URI, etc.

The following discussion may be valid for any type of communication request or invitation from a calling party, including traditional voice calls and also for any type of multimedia communication. For example, a calling party may send a multimedia communication request or invitation with the intention of sending or fetching content, e.g. a "file", in any format for texts, images, video clips, audio, animations, etc.

Any user of a communication terminal has typically created one or more contact lists in the terminal containing at least the name and contact number/address of known individuals such as friends, relatives and colleagues, hereafter referred to as "known parties". The known parties may naturally also include members of any communication groups the user currently belongs to, e.g. using presence services according to the above. Contact lists for such communication groups are then maintained in corresponding application servers in a service network. Further, search engines are also available over the Internet holding personal relationships, sometimes referred to as "friend-of-a-friend" data. In the case of presence services, each entry in a contact list is associated with different media that can be used for communication with that contact or party.

If a user receives a call or session invitation from any known party present in such a list or group, the receiving terminal will typically notify the user automatically on the identity of the calling party on a terminal display or by means of a specific ring signal or the like. Thereby, the called user can decide how to respond depending on the identity of the calling party. In some cases, the terminal may itself decide how to respond automatically, e.g. based on the caller identity, any relevant contact lists defined for the called user including "black lists" or "white lists", respectively, or similar. This automatic response function is typically implemented as a user agent, or so-called "presence agent", either in the terminal or in an application server.

On the other hand, if a call or session invitation is received from an unknown party not present in any contact list or group defined for the receiving user, he/she (or a user agent) will be unaware of the caller's identity and/or not recognise the calling number if displayed, before responding. In that case, the called user or user agent has basically three options: 1) respond with a message implying acceptance to communicate, 2) respond with a message implying rejection to communicate (which may be a so-called "polite block" message in the style of "out-of-office" or the like), and 3) not respond at all. It should be noted that options 1) and 2) may effectively open the user for potential illicit attacks, whereas option 3) will be safe in that respect but the called user may then on the other hand neglect a potentially interesting and desirable communication with the calling party.

Figure 1:
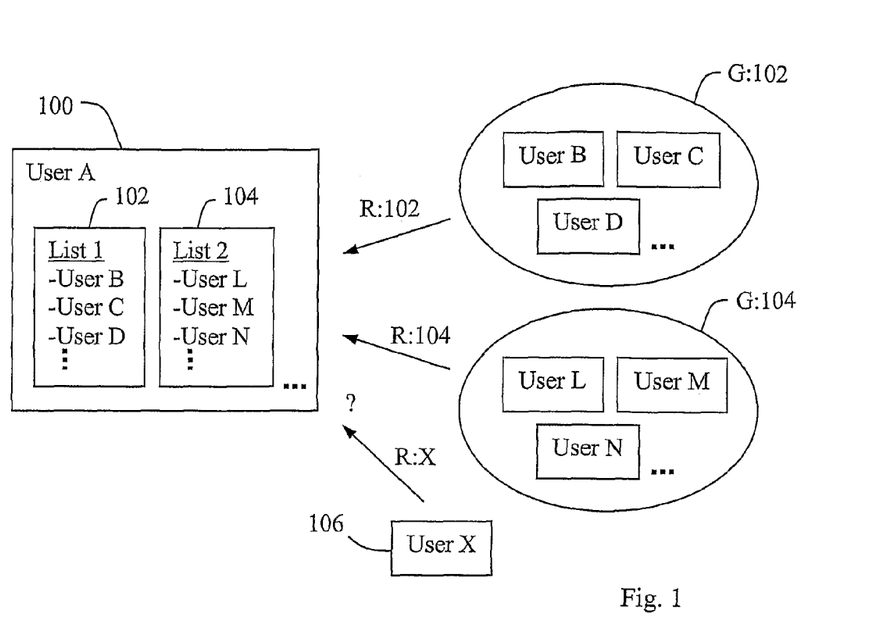
FIG. 1 is a schematic communication scenario when a user A receives calls from different known and unknown users, according to the prior art.

FIG. 1 illustrates schematically a typical communication scenario where multiple contact lists have been defined for a user A 100, of which a first list 102 and a second list 104 are shown, for various purposes such as contact lists in the manner of a "phone book" or the like, or group lists for presence services, etc. The contact lists 102, 104 . . . may be stored in the user's communication terminal and/or in an application server e.g. handling corresponding presence services or the equivalent. The first shown list 102 includes users B,C, D . . . making up a first user group G:102, and the second list 104 includes users L,M,N . . . making up a second user group G:104, as schematically illustrated. In this context, the term "user group" generally represents a set of users in any contact list, presence group, etc., pre-defined for the called user. Of course, further user groups, contact lists or the like, not shown, may have been defined for user A.

If a communication request R:102 or R:104 is received from any known user in group G:102 or G:104, respectively, the calling party identity and/or number/address will be known to user A and/or the receiving terminal accordingly, forming a basis for how to respond. However, if a communication request R:X is received from an unknown user X 106 not present in any contact list or group defined for the receiving user, the number/address of the calling party is unrecognised and user A, or the receiving terminal, cannot take the caller's identity into account when deciding how to respond.

Generally, it is a problem that communication terminal users and/or their user agents have insufficient or no basis for deciding how to respond to communication requests and invitations from unknown calling parties. It is also a problem that a called user has no possibility to know whether an unknown calling party can be regarded as "reliable" or not in some respect, or whether he/she is generally suitable to communicate with, e.g. as discussed above.

US 2006/0046720 A1 discloses a solution for giving to a mobile terminal user, identity information about a calling party that tries to establish communication with the mobile terminal. This solution may thus provide improved identification of the calling party, but would still not be helpful for assessing the caller's reliability if the given identification is unknown to the called party.

SUMMARY

The object of the present invention is to address at least some of the problems and issues outlined above. In particular, it is an object of the present invention to provide a solution that can facilitate determination of whether the calling party can be regarded as "reliable" and suitable for communication or not.

These objects and others are achieved primarily by providing a method and arrangement for investigating an unknown calling party having sent a communication request to a called party, in order to provide relation information to the called party regarding the calling party. The inventive method and arrangement can be implemented in a communication network or terminal serving the called party.

In the inventive solution, a relation query for the calling party is received from the called party, and the calling party is absent from any contact list that has been defined for the called party and comprising parties known and related to the called party. It is then determined whether the calling party is known and related to a third party directly or indirectly known and related to the called party, by checking if the third party is present in a contact list that has been defined for the third party and comprising parties known and related to the third party. Relation information is finally provided to the called party based on the outcome from said determination above.

In the determination above, at least one directly known and related third party may be selected from a contact list that has been defined for the called party, and it is then checked whether the calling party is known and related to the selected directly known third party by being present in any contact list that has been defined for the selected directly known third party. The determination may further include selecting at least one indirectly known third party from a contact list that has been defined for a directly known and related third party, and checking whether the calling party is known and related to the selected indirectly known third party by being present in any contact list that has been defined for the selected indirectly known third party.

The inventive method and apparatus may be implemented in an application server in an IMS network, and the contact list defined for the called party may be a group defined in said application server. The application server may be a presence server in the IMS network, and the contact list defined for the called party may then be a group defined for a presence service. Alternatively, the inventive method and apparatus may be implemented in an Internet server for providing "friend-of-a-friend" searches or the like.

The directly or indirectly known third party may be selected from a contact list defined for a specific application being used.

A response to the received relation query may also be sent to the called party, declaring either that the calling party is directly or indirectly known and related to one or more known third parties, or that the calling party is found to be wholly unrelated, depending on the outcome of the above determination. The response may be sent as soon as the calling party is found in a checked contact list. Alternatively, the above determination can be repeated for a plurality of third parties directly or indirectly known and related to the called party, regardless of whether the calling party is found in a checked contact list or not, before sending the response. In that case, the response could be sent when a predetermined time-out period has elapsed, or when a predetermined number of checks have been executed.

A logic policy engine can be created for deciding how to respond to incoming calls from unknown calling parties, based on any found relations of the calling parties with directly and/or indirectly known and related third parties.

The different features and embodiments in the present solution are defined as various steps and means in the inventive method and arrangement according to the appended claims.

In another aspect of the present invention, a caller investigation unit is also defined for use in a service entity in a communication network or terminal serving a called party.

The caller investigation unit comprises a query receiving part adapted to receive relation queries from called parties regarding unknown calling parties.

The caller investigation unit further comprises a relation determining part adapted to determine whether an unknown calling party is indirectly related to a called party, by selecting one or more third parties from contact lists for either the called party or any third parties directly or indirectly known to the called party, and checking whether the unknown calling party is present in contact lists of the selected third parties.

The caller investigation unit further comprises a response sending part adapted to send relation check responses to called parties in response to the relation queries, declaring either that a calling party is directly or indirectly known to a known third party, or that a calling party is found to be wholly unrelated, depending on the outcome from the relation determining part.

Further preferred features and benefits of the present invention will become apparent from the detailed description below.

BRIEF DESCRIPTION OF THE DRAWINGS

The present invention will now be described in more detail by means of preferred embodiments and with reference to the accompanying drawings, in which.

DESCRIPTION OF PREFERRED EMBODIMENTS

Briefly described, the present invention provides a solution for enabling assessment of whether an unknown calling party can be generally regarded as "reliable" or not in some respect. Basically, it is investigated whether the unknown caller is somehow indirectly related to the called party by being directly or indirectly related to any third party known to the called party, by checking a contact list defined for said third party.

In this context, an incoming call from a calling party may be a voice call or a session invitation for other types of communication, including multimedia, and the term "communication request" will be used hereafter in a broad sense to generally represent any type of incoming call or session invitation. The terms "caller" and "calling party" should also be understood in a broad sense and will be used here to represent a person/terminal/server that sends any form of communication request according to the above.

In the following description, it is mainly assumed that the calling party can be considered reliable if indirectly related and known in this way, such that the called party, i.e. a person or a user agent (either in the terminal or an application server), can take any suitable action based upon that knowledge. It is thus assumed that an incoming call from a reliable party can be answered, accepted or otherwise responded to, without the risk of malicious attacks or the like.

On the other hand, if the calling party is directly or indirectly known to the third party, he/she may still be considered "unreliable", e.g. depending on a policy of the third party for handling contacts. For example, it may turn out that the calling party is indirectly known by being present on a black list or the like defined for the third party, implying that the calling party is considered unreliable or otherwise unsuitable for communication.

If the caller is found not to be indirectly related to the called party in this way, and is thereby not considered reliable, the incoming call or session invitation can be treated accordingly, typically by not responding at all to eliminate any risk of malicious attacks. It should be noted that this solution provides a mechanism for investigating whether the unknown caller is somehow indirectly related to the called party or not, whereas the question of reliability is ultimately subject to assessment that can be based on the knowledge of any found relationship.

Figure 2:
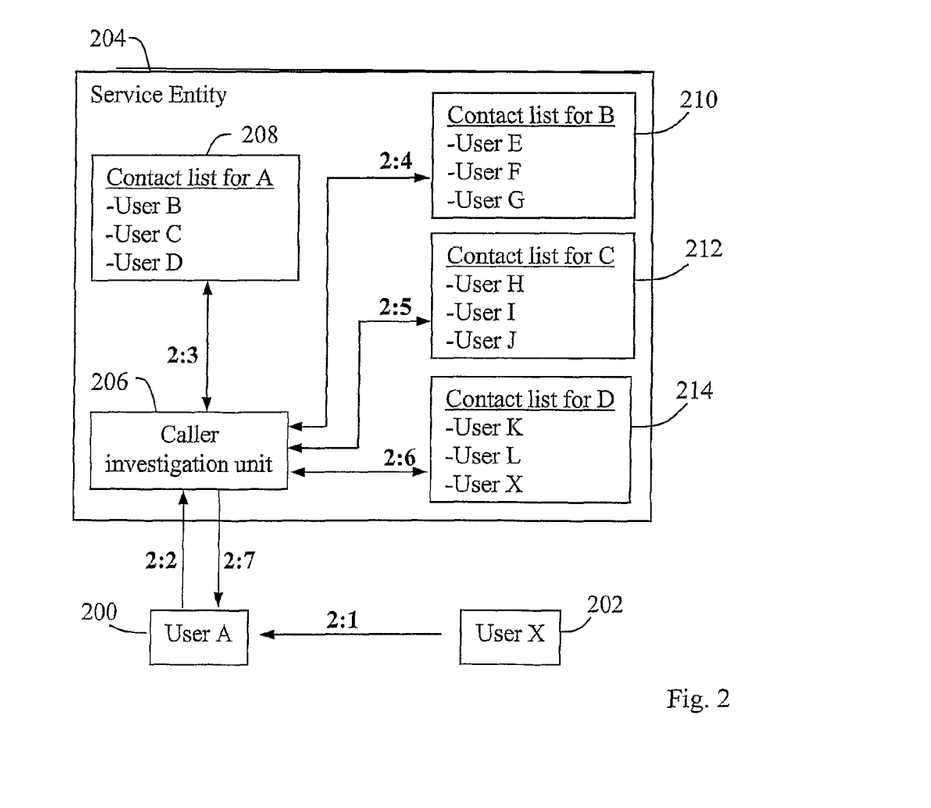
FIG. 2 is a schematic block diagram illustrating a procedure and arrangement when a user A receives a call from an unknown user X, according to one embodiment.

The inventive procedure and arrangement for providing relation information on an unknown calling party in this manner will now be described by way of preferred embodiments. FIG. 2 is a schematic block diagram illustrating an exemplary case when a user A denoted 200 receives a communication request from an unknown user X denoted 202. Thus, user A is the called party and user X is the calling party.

A service entity 204 in a communication network serving user A is shown, which may be an IMS application server such as a presence server. Service entity 204 may also be an Internet server, e.g. for providing "friend-of-a-friend" searches or the like. Moreover, service entity 204 may also be implemented in a communication terminal used by user A. Generally, the service entity 204 may be any type of communication service entity or node serving user A, either within or outside a service network, or in the terminal of user A, and the present invention is not limited in this respect. A caller investigation unit 206 in service entity 204 is adapted to provide relation information on calling parties, according to the following description. As mentioned above, a calling party or caller may be any person/terminal/server that sends any form of communication request to a called party.

A contact list 208 of known users B,C,D, i.e. parties known and related to the called party, has been defined for user A, which is stored in service entity 204. Additionally, the contact list 208 may also be stored in a terminal of user A and/or in a separate contact database in general. The present solution assumes that the list is somehow available to caller investigation unit 206, either within the communication network and/or service entity serving user A, or from some external database or node. For example, this solution can be used for so-called "buddy lists" or similar in connection with presence services provided in an IMS network. In that case, service entity 204 is a presence server where the contact list 208 is stored. In the following description, the term "user A" refers primarily to a person, but it may also be a user agent acting automatically in the described manner when implemented either in a terminal or in an application server.

In a first illustrated step 2:1, user A 200 thus receives a communication request from user X 202, for commencing some kind of communication, e.g. a voice call or a multimedia session involving communication of media in either direction or both. User A then detects that the calling party user X is unknown. As mentioned above, it would be desirable for user A to assess whether user X can be regarded as reliable or not before responding, since starting the communication, or even merely responding to the request, may expose user A to potentially malicious attacks or the like.

Therefore, user A sends a relation query for user X to the caller investigation unit 206, in a step 2:2, effectively asking whether the calling user X is indirectly related to user A in any way. The relation query may be sent manually or automatically from user A. In response thereto, caller investigation unit 206 first checks contact list 208 in a following step 2:3 and finds that the calling party user X is not present there, and is thus not directly known and related to user A. Of course, further contact lists may have been predefined for user A, but the present example is simplified in assuming only one such list. In order to find out whether user X is indirectly known and related to user A, and therefore can be regarded as reliable, the following further steps can be executed.

Next, a user B, being directly known and related to user A, is selected from user A's contact list 208. A similar contact list 210 containing users E,F,G has also been defined for user B which is available to the caller investigation unit 206, in this case being stored in service entity 204. Caller investigation unit 206 then checks in a step 2:4 whether user X is present in user B's contact list 210, to find out whether user X is thereby known and related to user B. In this example, user X is not found in B's contact list 210 either, and is thus not known to user B.

Next, another user C, directly known and related to user A, is further selected from user A's contact list 208. A similar contact list 212 containing users H,I,J has been likewise defined for user C, and caller investigation unit 206 checks in a further step 2:5 whether user X is present in user C's contact list 212 to find out if user X is known and related to user C. Not found in contact list 212, user X is thus not known to user C either.

In the same manner, another known and related user D is selected from user A's contact list 208, and caller investigation unit 206 checks in a further step 2:6 whether user X is known and related to user D by being present in a contact list 214 predefined for user D and containing users K,L,X known and related to user D. In this case, user X is actually found in user D's contact list 214, implying that user X is indirectly known and related to user A by being directly known and related to user D. In this context, user D is thus a third party directly known and related to the called user A since present in contact list 208.

Finally, caller investigation unit 206 communicates a relation check response to user A in a step 2:7, in response to the relation query of step 2:2, basically declaring that "X is known to D who is known to A", or anything similar to that effect. Hence, user A is now free to consider this fact when deciding how to respond to the communication request from user X, received initially in step 2:1.

Next, another exemplary embodiment is described with reference to a schematic block diagram shown in FIG. 3, when a user A denoted 300 receives a communication request from an unknown user X denoted 302. Similar to FIG. 2, a service entity 304, implemented as a node in a communication network serving user A or in a communication terminal used by user A, comprises a caller investigation unit 306 adapted to provide relation information on calling parties. A contact list 308, defined for user A and containing users B,C,D known and related to user A, is available to caller investigation unit 306, e.g. by being stored in service entity 304 as shown.

In a first step 3:1, user A receives a request for communication from user X who is unknown to user A, and user A therefore sends a relation query for user X to the caller investigation unit 306, in a step 3:2. In response thereto, caller investigation unit 306 retrieves contact list 308 in a following step 3:3, where user X cannot be found, and selects a known user B therefrom.

A contact list 310 containing users E,F,G known and related to user B has been defined for user B, in this case likewise stored in service entity 304. Caller investigation unit 306 then checks in a step 3:4 whether user X is present in B's contact list 310, but finds that he/she is not. A similar check may be performed for other users C and D selected from user A's contact list 308, by checking the presence of user X in their contact lists 312 and 314, respectively, as illustrated by an optional further step 3:4a.

In this example, e.g. after checking contact lists defined for all users in the contact list 308 without finding user X, the process moves on one level further by selecting a user E from the contact list 310 for user B and checking a contact list 316 predefined for the selected user E. That is, the selected user E is directly known and related to user B and thereby indirectly known and related to user A via user B.

Caller investigation unit 306 checks in a further step 3:5 whether user X is present in the selected user E's contact list 316, to find out if user X is known and related to user E. As shown in the figure, contact list 316 contains users H,I,X and user X is accordingly found there, thus being known and related to user E. Consequently, user X is indirectly known and related to user A by being directly known and related to user E and indirectly known and related to user B via user E. In this context, user E is thus a third party indirectly known and related to the called, user A since present in contact list 310 of user B who in turn is present in the contact list 308 of user A.

If user X had not been found present in user E's contact list 316, the checking process might have continued for other users F and G selected from user B's contact list 310 in their respective contact lists 318 and 320, as illustrated by an optional further step 3:5a. Indeed, such further checks may also be performed for any number of users in any of contact lists 310, 312 and 314 for B,C and D, respectively, regardless of whether user X is found or not. It may then turn out that user X is known and related to more than one other user, which would reasonably increase the reliability of user X, or at least provide a better basis for the decision of how to respond.

Finally, after finding user X in user E's contact list 316 in this case, the caller investigation unit 306 communicates a relation check response to user A in a step 3:6, in response to the relation query of step 3:2, declaring that "X is known to E who is known to B who is known to A", or similar. Hence, user A can consider this fact when deciding how to respond to the communication request from user X, received initially in step 3:1. Any additional other users found knowing user X may be included in this message as well.

A logic policy engine may be created for user A for how to consider any found relations of user X with directly or indirectly known other users or third parties. Such a policy engine may be adapted to aggregate similar policy engines of other users directly and indirectly known to user A, in order to automatically filter and/or otherwise handle incoming calls accordingly from unknown callers.

In the above example illustrated by FIG. 2, the relation check of how the calling user X is related to the called user A is made in one level by checking the contact lists of users present in the contact list for the called user A. In the example of FIG. 3, this relation check is taken one level further by also checking the contact lists of users present in the contact lists of users present in user A's contact list. Basically, there is no limit in the present solution as to how many user's contact lists and/or levels that can be checked in the above-described manner.

An exemplary procedure will now be described, with reference to the flow chart in FIG. 4, for performing a caller investigation in order to provide relation information on an unknown calling party. This procedure may be executed in a service entity in a communication network or terminal serving a called party, and more specifically in a caller investigation unit such as in the examples of FIGS. 2 and 3, respectively.

In a first step 400, a relation query is received from a called party, as to whether an unknown calling party is indirectly related to the called party in any way, basically corresponding to steps 2:2 and 3:2, respectively, in the above examples. The calling party is thus absent from any contact list or presence group that has been predefined for the called party, hence unknown.

In a next step 402, a directly known and related third party is selected from a contact list of the called party. The third party may be selected from a contact list defined for a specific application being used, such as IM. Thereafter, a contact list of the selected third party is checked with respect to the calling party, in a step 404. In a following step 406, it is determined whether the unknown calling party is present in the checked contact list of the selected third party. If so, a response in the form of a relation check response or the like may be send to the called user at this stage effectively declaring that the calling party is known and related to the selected third party, in a step 408.

If the calling party is determined as not being present in the checked contact list in step 406, it is determined in a further step 410 whether there are any further third party that can be subject to a contact list check as in step 404. If so, the process returns to step 402 and another third party is selected in order to check whether the calling party is present in his/her contact list. When there are no more third party to check, or a predetermined time-out period has elapsed, or a predetermined number of checks have been executed, a relation check response is sent to the called user effectively declaring that the calling party is found to be wholly unrelated, in a final step 412.

Figure 4:
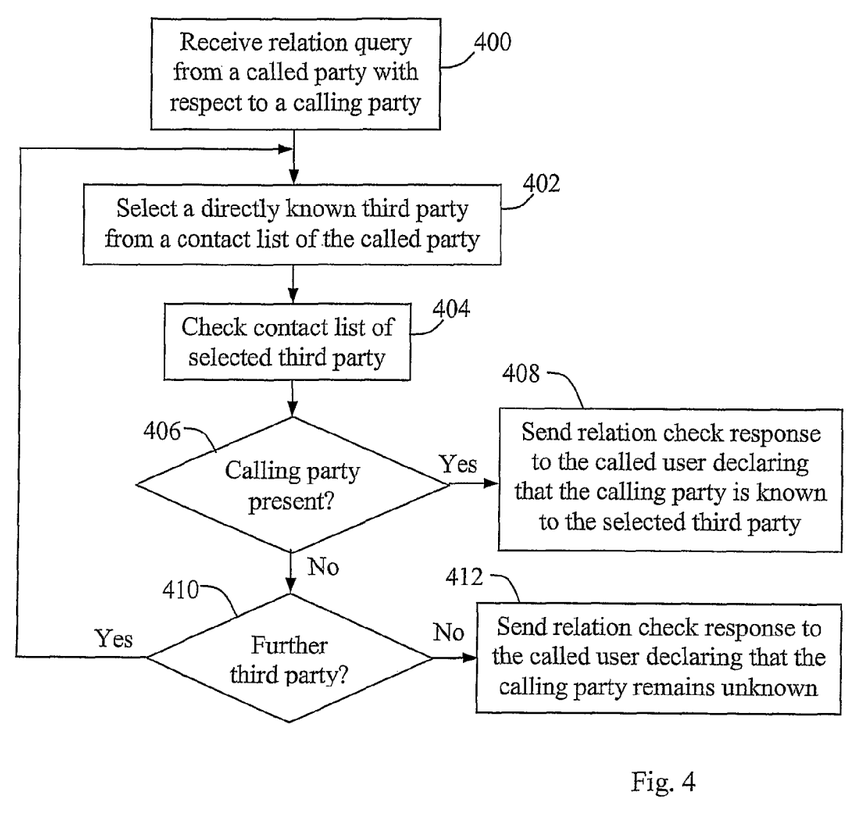
FIG. 4 is a flow chart illustrating a procedure for performing a caller investigation of an unknown calling party, according to another embodiment.

The above-described process of FIG. 4 can be modified in different ways. For example, steps 402, 404 and 410 may be repeated for any number of third parties directly or indirectly known to the called party, regardless of whether the calling party is found in a contact list or not, thus omitting the determining step 406. Certain third parties known to the called party who may be particularly trustworthy may have been preselected by the called party for checking their contact lists in the first place. Then, after exhausting any relevant contact lists, the relation check response of either step 408 or 412 may be sent to the called party, depending on the outcome of the executed caller investigation. In another example, the checking process may continue until a predetermined time-out period has elapsed, or a predetermined number of checks have been executed. At this point, the relation check response can be finally issued, regardless of whether the calling party is found or not.

Figure 5:
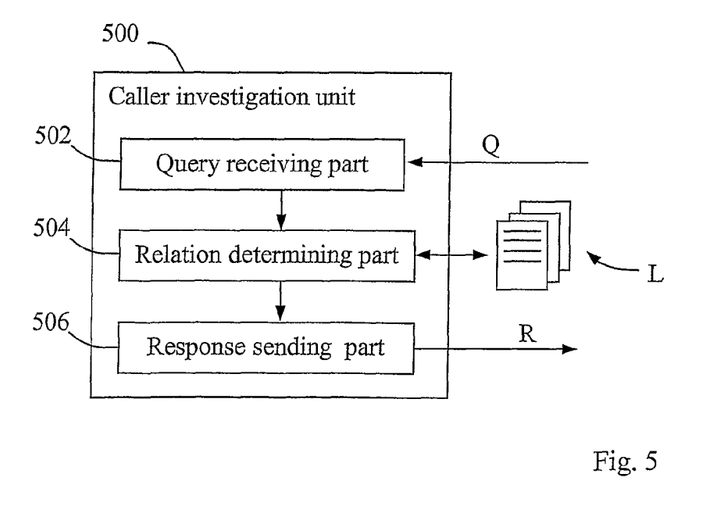
FIG. 5 is a logic block diagram of a caller investigation unit, according to another embodiment.

An exemplary embodiment of a caller investigation unit is shown in more detail as a logic block diagram in FIG. 5, which may be adapted to operate basically as described above for the caller investigation units 206 and 306 in FIGS. 2 and 4, respectively. The caller investigation unit 500 comprises a query receiving part 502, a relation determining part 504 and a response sending part 506.

Figure 3:
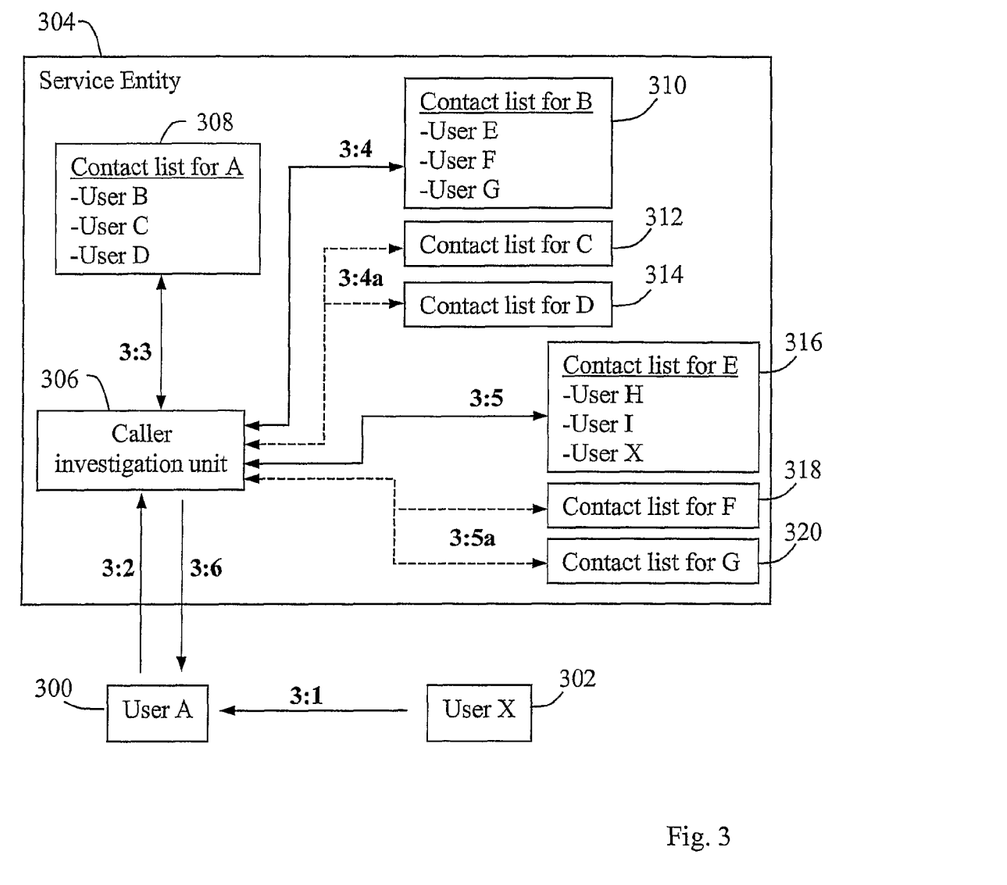
FIG. 3 is a schematic block diagram illustrating a procedure and arrangement when a user A receives a call from an unknown user X, according to another embodiment.

The query receiving part 502 is basically adapted to receive relation queries Q from called parties regarding unknown calling parties, e.g. as described for steps 2:2 and 3:2 in FIGS. 2 and 3, respectively.

The relation determining part 504 is basically adapted to find out whether an unknown calling party is somehow indirectly related to a called party, by selecting third parties from contact lists L for either the called party or any third parties directly or indirectly known to the called party, and checking whether the unknown calling party is present in contact lists of the selected third parties, e.g. as described for steps 2:3-2:6 and 3:3-3:5a in FIGS. 2 and 3, respectively.

The response sending part 506 is basically adapted to send relation check responses R to called parties in response to the relation queries Q, declaring either that a calling party is directly or indirectly known to a known third party, or that a calling party is found to be wholly unrelated, depending on the outcome from the relation determining part 504, e.g. as described for steps 2:7 and 3:6 in FIGS. 2 and 3, respectively.

It should be noted that the different functional parts 502-506 may be implemented by means of any suitable hardware and software, and the schematic structure of the caller investigation unit 500 presented in FIG. 5 is purely logical.

The present invention thus provides a solution for investigating whether an unknown calling party is somehow indirectly related to a called party by being directly or indirectly related to any third party known and related to the called party. Thereby, the called party may be able to better assess whether the unknown calling party can be regarded as "reliable" or not in some respect, which can be used for deciding how to handle the incoming call, either manually by a person or automatically by a user agent.

In the present invention, an aggregated network of trusted relationships is basically formed by effectively linking the contact lists of directly or indirectly known and related parties in the above-described manner. This information of such linked relationships would otherwise be practically impossible to build up and maintain as a single database for a specific user.

As mentioned above, a logic policy engine may be created for a user for deciding how to respond to incoming calls from unknown callers, considering any found relations of a calling party with directly or indirectly known other users or third parties. The logic policy engine may be dictated by the user's assessments of various calling parties or third parties, where some parties are deemed more trustworthy or reliable than others.

Furthermore, a logic policy engine may be configured to accept communication requests and/or add a calling party to a group for a called party, if found related in a trustworthy manner. Even third parties indirectly known and related to the called party may be included in the group. A group learning mechanism may also be used for forming a policy for such a group. Still further, some users may allow or not allow certain other users to look up their contact lists and policies, which must also be taken into account.

The logic policy engine may also be configured to aggregate similar policies of other users, and to apply various algorithms, either by default or selectively, for assessing whether an unknown party can be deemed reliable or not. For example, one algorithm may dictate that an unknown calling party will be deemed unreliable if he/she is present on a contact list of anyone previously deemed unreliable, and so forth.

While the invention has been described with reference to specific exemplary embodiments, the description is generally only intended to illustrate the inventive concept and should not be taken as limiting the scope of the invention, which is defined by the appended claims.

The invention claimed is:

1. A method of investigating an unknown calling party having sent a communication request to a called party, in order to provide relation information to the called party regarding the calling party, as executed in a communication network or terminal serving said called party, comprising the steps of:
   receiving a relation query for the calling party from the called party, said calling party being absent from any contact list that has been defined for the called party and comprising parties known and related to the called party;
   determining whether the calling party is known and related to a third party directly or indirectly known and related to the called party in a contact list that has been defined for the called party, by checking if the calling party is present in a contact list that has been defined for said third party and comprising parties known and related to the third party; and,
   providing relation information to the called party based on the outcome from said determining step.

2. The method according to claim 1, wherein said determining step includes selecting at least one directly known and related third party from said contact list of the called party, and checking whether the calling party is known and related to the selected directly known third party by being present in any contact list that has been defined for the selected directly known third party.

3. The method according to claim 2, wherein said determining step includes further selecting at least one indirectly known third party from a contact list that has been defined for a directly known and related third party, and checking whether the calling party is known and related to the selected indirectly known third party by being present in any contact list that has been defined for the selected indirectly known third party.

4. The method according to claim 1, implemented in an application server in an IMS network, wherein said contact list defined for the called party is a group defined in said application server.

5. The method according to claim 4, wherein said application server is a presence server in the IMS network, and said contact list defined for the called party is a group defined for a presence service.

6. The method according claim 1, implemented in an Internet server for providing "friend-of-a-friend" searches or the like.

7. The method according to claim 2, wherein said directly or indirectly known third party is selected from a contact list defined for a specific application being used.

8. The method according to claim 1, wherein a response to the received relation query is sent to the called party, said response declaring either that said calling party is directly or indirectly known and related to one or more known third parties, or that the calling party is found to be wholly unrelated, depending on the outcome of said determining step.

9. The method according to claim 8, wherein said response is sent as soon as the calling party is found in a checked contact list.

10. The method according to claim 8, wherein said determining step is repeated for a plurality of third parties directly or indirectly known and related to the called party, regardless of whether the calling party is found in a checked contact list or not, before sending said response.

11. The method according to claim 10, wherein said response is sent when a predetermined time-out period has elapsed, or when a predetermined number of checks have been executed.

12. The method according to claim 1, wherein a logic policy engine is created for deciding how to respond to incoming calls from unknown calling parties, based on any found relations of the calling parties with directly and/or indirectly known and related third parties.

13. An arrangement for investigating an unknown calling party having sent a communication request to a called party, in order to provide relation information to the called party regarding the calling party, when implemented in a communication network or terminal serving said called party, comprising:
   means for receiving a relation query for the calling party from the called party, said calling party being absent from any contact list that has been defined for the called party and comprising parties known and related to the called party;
   means for determining whether the calling party is known and related to a third party directly or indirectly known and related to the called party in a contact list that has been defined for the called party, by checking if the calling party is present in a contact list that has been defined for said third party and comprising parties known and related to the third party; and,
   means for providing relation information to the called party based on the outcome from said determining means.

14. The arrangement according to claim 13, said determining means being adapted to select at least one directly known and related third party from said contact list of the called party, and to check whether the calling party is known and related to the selected directly known third party by being present in any contact list that has been defined for the selected directly known third party.

15. The arrangement according to claim 14, said determining means being adapted to further select at least one indirectly known third party from a contact list that has been defined for a directly known and related third party, and to check whether the calling party is known and related to the selected indirectly known third party by being present in any contact list that has been defined for the selected indirectly known third party.

16. The arrangement according to claim 13, implemented in an application server in an IMS network, wherein said contact list defined for the called party is a group defined in said application server.

17. The arrangement according to claim 16, wherein said application server is a presence server in the IMS network, and said contact list defined for the called party is a group defined for a presence service.

18. The arrangement according to claim 13, implemented in an Internet server for providing "friend of-a-friend" searches or the like.

19. The arrangement according to claim 14, said determining means being adapted to select said directly or indirectly known third party from a contact list defined for a specific application being used.

20. The arrangement according to claim 13, said providing means being adapted to send a response to the received relation query to the called party, said response declaring either that said calling party is directly or indirectly known and related to one or more known third parties, or that the calling party is found to be wholly unrelated, depending on the outcome from said determining means.

21. The arrangement according to claim 20, said providing means being adapted to send said response as soon as the calling party is found in a checked contact list.

22. The arrangement according to claim 20, said determining means being adapted to check a plurality of third parties directly or indirectly known and related to the called party, regardless of whether the calling party is found in a contact list or not, before sending said response.

23. The arrangement according to claim 22, said providing means being adapted to send said response when a predetermined time-out period has elapsed, or when a predetermined number of checks have been executed.

24. The arrangement according to claim 13, adapted to create a logic policy engine for deciding how to respond to incoming calls from unknown calling parties, based on any found relations of the calling parties with directly or indirectly known and related third parties.

25. A caller investigation unit for use in a service entity in a communication network or terminal serving a called party, comprising:
 a query receiving part adapted to receive relation queries from called parties regarding unknown calling parties;
 a relation determining part adapted to determine whether an unknown calling party is indirectly related to a called party in a contact list that has been defined for the called party, by selecting one or more third parties either from said contact list of the called party or from contact lists for any third parties directly or indirectly known to the called party, and checking whether the unknown calling party is present in contact lists of the selected third parties; and,
 a response sending part adapted to send relation check responses to called parties in response to the relation queries, declaring either that a calling party is directly or indirectly known to a known third party, or that a calling party is found to be wholly unrelated, depending on the outcome from said relation determining part.

* * * * *